United States Patent
Sato et al.

[15] 3,701,151
[45] Oct. 24, 1972

[54] METHOD AND APPARATUS FOR MEASURING THE DISTANCE OF TRAVEL AND THE SPEED OF A MOVING OBJECT

[72] Inventors: Kazuo Sato; Takashi Aoki, both of Toyota, Japan

[73] Assignee: Toyota Jidosha Kogyo Kabushiki Kaisha, Tokyo-shi, Japan

[22] Filed: Feb. 23, 1971

[21] Appl. No.: 118,036

[52] U.S. Cl..........................343/9, 343/8, 343/12 R
[51] Int. Cl...............................G01s 9/24, G01s 9/46
[58] Field of Search................................343/8, 9, 12

[56] References Cited

UNITED STATES PATENTS

| | | | |
|---|---|---|---|
| 3,438,032 | 4/1969 | Cook | 343/12 R |
| 3,611,368 | 10/1971 | Crownover | 343/12 R X |
| 3,327,307 | 6/1967 | Miles | 343/9 |
| 2,248,727 | 7/1941 | Strobel | 343/12 R |

*Primary Examiner*—Malcolm F. Hubler
*Attorney*—Cushman, Darby & Cushman

[57] ABSTRACT

A method and apparatus for measuring the distance traveled by and the speed of a moving object incorporating a frequency mixing system, in which both a transmitter and a receiver are mounted on a moving object to be measured and also at a fixed point so that, when one of the moving objects and the fixed point is assumed as a first point and the other as a second point, a radio wave having a first reference frequency $f_A$ and transmitted from the transmitter at the first point is received at the second point where a secondary frequency $f_C$ is generated with the sum of the first reference frequency $f_A$ received and an internally-generated second reference frequency $f_B$, and this secondary frequency $f_C$ is then transmitted from the second point and is received at the first point where this received wave of the frequency $f_C$ is mixed with another secondary frequency having the same frequency as that of the secondary frequency $f_C$, which is generated with the sum of the first reference frequency $f_A$ and another second reference frequency of the same frequency as that of the second reference frequency $f_B$ which is generated at the first point, so as to produce crests or valleys in the resultant waves, whereby in accordance with variations of the distance traveled between the first and second points, and information related to the wavelength of the secondary frequency $f_C$ is obtained which is then quantized to measure the distance traveled by and the travelling speed of the moving object.

3 Claims, 3 Drawing Figures

PATENTED OCT 24 1972 3,701,151
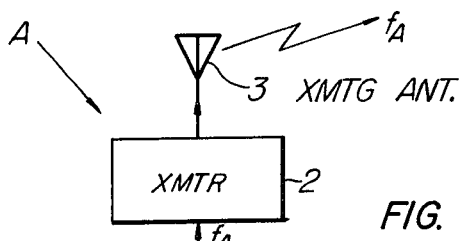
FIG. 1a
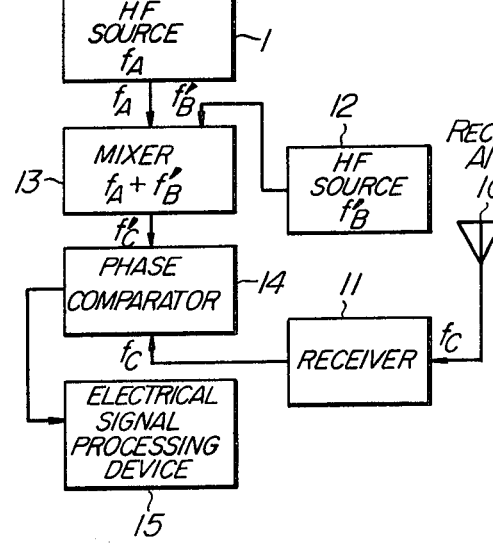
FIG. 1b
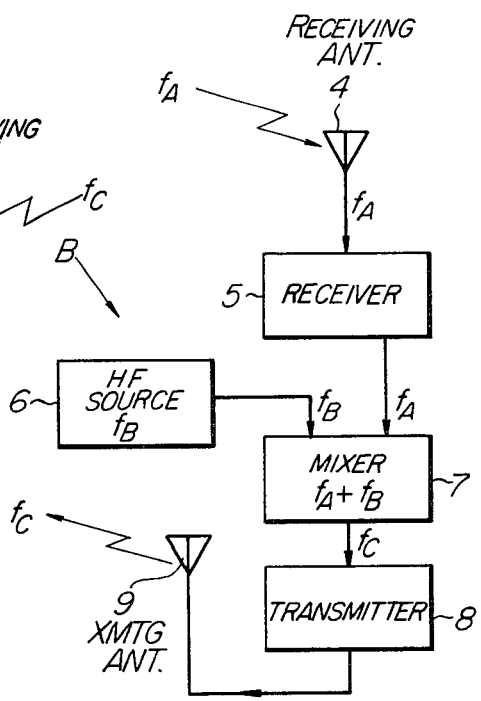
FIG. 2
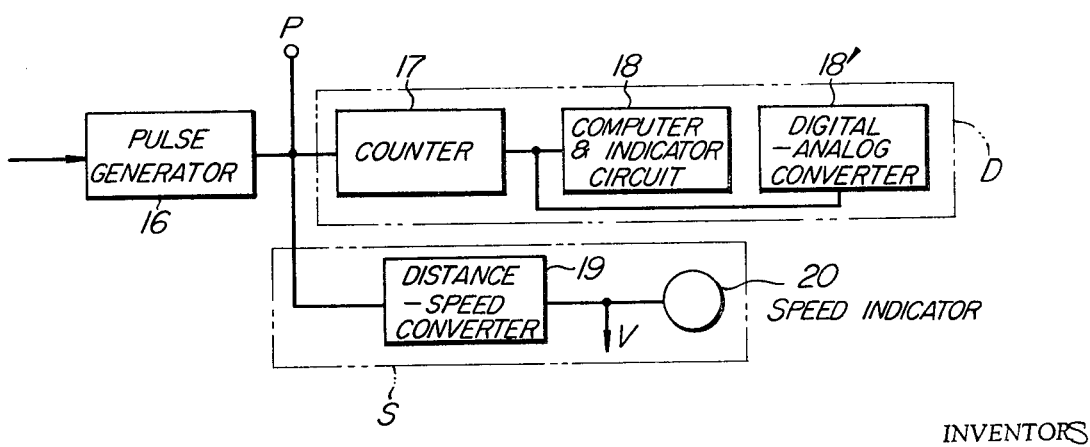
INVENTORS
Kazuo SATO
Takashi AOKI
BY Cushman, Darby & Cushman
ATTORNEYS

METHOD AND APPARATUS FOR MEASURING THE DISTANCE OF TRAVEL AND THE SPEED OF A MOVING OBJECT

BACKGROUND OF THE INVENTION

1. Field of The Invention

The present invention relates to a method and apparatus for measuring with high accuracy the distance of travel and the speed of a moving object running through a specified length of the course without establishing any specific reference point within the course.

2. Description of The Prior Art

Various measurement systems have hitherto been employed to measure the distance of travel and the speed of a moving object. These include a measurement system where the distance and the speed are measured according to the rotation of the wheel of a moving object, and another system in which the Doppler signals produced by Doppler radar are employed for measurement purposes. A further system is used in which light projectors and phototubes, for example, are set on the ground at specified intervals so that the passage of a moving object is detected on the ground or on the moving object itself, whereby the time required for the moving object to go from one light projector to another within the course is determined to obtain an average speed between the two projectors.

The measurement by detecting the rotation of the wheel is inaccurate owing to wheel slip, a variation in the effective diameter of the wheel, and so forth. On the other hand, if Doppler radar is employed to take measurements on the moving object, it is inconvenient to mount the Doppler radar measurement system on the moving object for such reasons that errors occur due to the vibration of the moving object, the system tends to be complicated in construction, and it is necessary to employ a larger antenna. Furthermore, the measurement system employing the reference points established on the ground has a drawback in that when taking a measurement, it must be started from a specified position.

SUMMARY OF THE INVENTION

The object of the present invention is to provide an apparatus for measuring the travel distance and speed and a measuring method wherein, in order to eliminate the aforesaid drawbacks of the conventional systems, variations in the distance between a point A representing the position of a moving object and a point B representing a fixed point B on the ground are measured by means of radio waves of different frequencies which are radiated from the points A and B, respectively. More particularly, the radio wave radiated from the point A has a first reference frequency and the frequency of the radio wave transmitted from the point A is received at the point B so that this received frequency is combined with a second reference frequency generated at the second point to generate and transmit a secondary frequency radio wave, while a high frequency wave having a secondary frequency which is the same or very close to the first-mentioned secondary frequency is generated in a similar manner at the point A which transmits the radio waves having the first reference frequency, whereby this high frequency wave is compared and combined at the point A with the radio wave transmitted from the point B so as to quantize the distance traveled by the moving object in accordance with the variations in the intensity of the resultant waves due to changes in the distance of transmission of the radio waves between the two points.

According to the present invention, even if high frequency stability cannot be ensured for VHF or UHF waves which determine the required range resolution, measurements according to the principle of the present invention can be carried out by commonly employing the aforesaid transmitted waves for the frequency conversion operations and simply by selecting those beat frequencies, which are produced by the difference between the frequencies of the received waves and those of separately provided local oscillators, to have a value as low as capable of being tolerated from the standpoint of accuracy of measurement (ideally zero beat frequency), Moreover, the present invention has a remarkable effect in that since a frequency $f_A$ is variable according to the principle of measurement of this invention, the frequency $f_A$ can be selected to have any given value to suit a required range resolution with a high degree of freedom and hence the frequency $f_C$ can also be selected to have any given value.

Furthermore, since the measurement system of the present invention has, among others, a feature that any given location on a test course can be selected as a starting point for taking a measurement, it eliminates the deficiency of the prior art systems, that is, the necessity to preliminarily establish any reference point on the ground and to always start the measurement at this particular reference point as would be the case with the conventional acceleration, coasting and other similar test runs of an automobile. At the same time, there is a remarkable effect in that measurements of high accuracy can be easily achieved not only on a moving object, but also at any fixed point established on the ground.

BRIEF DESCRIPTION OF THE DRAWINGS

FIGS. 1a and 1b are block diagrams of an electrical circuit according to the present invention.

FIG. 2 is a block diagram of an electrical signal processing circuit according to the present invention.

DESCRIPTION OF THE PREFERRED EMBODIMENTS

The present invention will now be explained with reference to the accompanying drawings. In FIG. 1a, designated as A is the first component portion of the electric circuit, while the second component portion of the electrical circuit is designated as B in FIG. 1b. In these figures, numeral 1 designates a source of high frequency $f_A$, 2 an $f_A$ wave transmitter, 3 an $f_A$ wave transmitting antenna, 4 an $f_A$ wave receiving antenna, 5 an $f_A$ wave receiver, 6 a source of high frequency $f_B$, 7 a mixer for obtaining the sum frequency $f_C$ of the of the $f_A$ and $f_B$ waves, 8 an $f_C$ wave transmitter, 9 an $f_C$ wave transmitting antenna, 10 an $f_C$ wave receiving antenna, 11 an $f_C$ wave receiver, 12 a source of high frequency $f'_B$, 13 a mixer for obtaining the sum frequency $f'_C$ of the $f_A$ and $f'_B$ waves, 14 a phase comparator for comparing the phase of the $f'_C$ wave generated in the first component portion A with that of the received $f_C$ wave, 15 an electrical signal processing device for obtaining the distance of travel and the speed of a moving object.

For taking measurements with the apparatus of the present invention, two methods may be employed, that is, one in which the first component portion A is moved and the second component portion B is fixed and another in which the portion A is stationary and the portion B is movable. In the discussion to follow, the operating principle of the apparatus of the invention will be explained with reference to FIGS. 1a and 1b with the assumption that the component portion A is mounted on a moving object and the component portion B is set at one end of the test course.

A $f_A$ wave (a pilot wave) generated from the source 1 of high frequency $f_A$ mounted on the moving object is transmitted towards the fixed point B by way of the antenna 3 from the transmitter 2 and the antenna 4 receives this transmitted wave. The received $f_A$ wave is amplified up to a required voltage by the receiver 5 and it is then fed to the mixer 7.

The high frequency source 6 consists of a source of local oscillation which is table in amplitude and frequency and it supplies a high frequency wave of frequency $f_B$ to the mixer 7 along with the $f_A$ wave. The mixer 7 is a circuit for producing the sum frequency and it produces as its output signal a signal wave having a frequency $f_A + f_B = f_C$. As will be explained later, this $f_C$ wave is signal wave which determines the minimum quantization unit employed in the present measurement and it is transmitted back to the moving object A by way of the transmitter B and the antenna 9. The, this $f_C$ wave is received by the moving object A by means of the antenna 10, so that it is amplified up to a required voltage by the receiver 11. Within the moving object A, an $f_A$ wave branched from the source 1 of high frequency $f_A$ and an $f'_B$ wave generated from the source 12 of local oscillation are supplied to the mixer 13 so that a high frequency having a frequency $f_A + f'_B = f'_C$ is produced in a similar manner as at the fixed point B. This $f'_C$ wave is utilized as a reference signal for detecting the time delay of the $f_C$ wave due to its propagation from the point B to the moving device A after it is transmitted at the point B. In other words, the $f'_C$ wave and the received $f_C$ wave have the same frequency and there is a time difference therebetween which corresponds to the distance between the two points A and B. Assume that the $f_C$ wave radiated from the transmitter 8 at the fixed point B and propagated to the moving device A apart from the point B by L ($M$), has an amplitude given by:

$$a(t) = A \sin \omega_1 t \quad (1)$$

Then, if $a'(t)$ represents the amplitude of the wave received by the moving device A, $a'(t)$ may be expressed with respect to a given time t as follows:

$$a'(t) = A \sin \omega_1(t - L/C) \quad (2)$$

where L is the distance between the points A and B, C is the velocity of propagation between the two points and $\omega_1 = 2\pi f_C$, while $L/C$ represents the aforesaid time difference corresponding to the distance L and $a'(t)$ has a time delay of $L/C$ seconds (or $2\pi f_C L/C$ rad. in terms of phase angle) behind $a(t)$.

On the other hand, the amplitude of the $f_C$ wave generated from the moving object A is given by:

$$a''(t) = A \sin \omega_2 t \quad (3)$$

Then, if an addition $a'(t) + a''(t)$ is performed in the equations (2) and (3), there results $f_C = f'_C$ if $\omega_1$ and $\omega_2$ in the equations (1) and (2) are equal to each other and thus the amplitude of the resulting wave varies along with a change in the phase angle $2\pi f_C L/C$ (rad.). Consequently, the distance L will be represented by the number of crests or valleys in the changing amplitude of the $f_C$ wave, because any change in the distance L necessarily results in a corresponding change in the phase angle so that every time that this phase angle coincides with a multiple of $\pi$ and an integer the resulting wave provides a crest or valley and this crest or valley is produced each time the moving object goes through a half-wave of the resulting waves. Since $\omega_1$ and $\omega_2$ in the equations (2) and (3) are generated separately by the device A and B respectively, they are not equal exactly to each other, so that a beat frequency is produced by the difference therebetween resulting in a variation of the amplitude in a similar manner as previously explained. However, as a measure to reduce at the stage of generating $f_C$ and $f'_C$ waves the effect of the difference between $\omega_1$ and $\omega_2$ on the result of measurements to such an extent that can be tolerated from a practical viewpoint, frequencies $f_B$ and $f'_B$ are added on the basis of a pilot frequency $f_A$ in the mixers 13 and 7 provided in the moving device A and the ground stationary device B, respectively. Since the frequency $f_A$ is a frequency common to the mixers 7 and 13, it has no effect on the relative stability of the respective frequencies $f_C$ and $f'_C$. Consequently, the frequency accuracy of the local oscillation frequencies $f_B$ and $f'_B$, that is, the beat frequencies produced by the frequencies $f_B$ and $f'_B$ can have an influence on the relative stability of $f_C$ and $f'_C$, resulting in errors of measurement. For example, if the local oscillation frequencies $f_B$ and $f'_B$ are selected to be 10 MHz and a frequency stability of not lower than $1 \times 10^{-9}$ is ensured, the beat frequencies due to $f_B$ and $f'_B$ may be maintained at a level less than 0.01 Hz, and hence the error in terms of the number of the minimum quantization units can be limited to less than two quantization units per the measuring time of 100 seconds.

The stability of the pilot frequency $f_A$ with time has no effect on the best frequency due to the difference between the frequencies $f_C$ and $f'_C$, but it has an effect only on the frequency accuracy, that is, the wavelength accuracy of the frequencies $f_C$ and $f'_C$. The accuracy of the frequency $f$ is normally of the order of $10^{-5 \sim -6}$ and the absolute accuracy of the distance as determined with this frequency accuracy is very high for the object of the apparatus of this invention. Thus, the stability of $f_A$ with time is negligible.

In this embodiment, a high frequency generating system for generating a pilot wave having the frequency $f_A$ may easily be obtained by such means in which the required $f_A$ wave is obtained by successively multiplying the frequency of a lower frequency, or by mixing a multiplied frequency of the frequency $f'_B$ with any other frequency. Furthermore, the measurement of the present invention can also be carried out by employing the $f_B$ and $f'_B$ waves as local oscillation sources of the superheterodyne reception system in the $f_A$ wave receiver 5 and the $f_C$ wave receiver 11, respectively, so as to produce separate intermediate frequencies which are in turn amplified for mixing, frequency multiplication or the like purposes. The intended object of the present invention can be similarly achieved according to the operating principle described above.

It is now evident that the common pilot frequency $f_A$ is utilized by the moving device A and the ground stationary device B, and the frequencies $f_B$ and $f'_B$ are combined with the pilot frequency $f_A$ in the device A and B, respectively, to obtain the frequencies $f_C$ and $f'_C$ (but the two frequencies are very close approximates to each other), whereby the resulting waves of the two frequencies $f_C$ and $f'_C$ are quantized with the unit of distance corresponding to a half-wave length of the $f_C$ wave and the stability of the $f_B$ and $f'_B$ waves is only ensured, thus permitting the measurement of changes in the distance between the two points A and B.

In FIG. 1a, numeral 15 designates an electrical signal processing device for deriving information relating to the distance from the variations of the amplitude of the resulting waves obtained according to the previously described operating principle and processing this distance information to obtain the distance traveled by and the speed of a moving object. FIG. 2 illustrates in detail the construction of the electrical signal processing device 15 shown in FIG. 1a. In FIG. 2, a portion designated as D contains the circuits for computing the distance traveled by the moving object and numeral 16 designates a pulse generator which usually comprises a detector, a saturation amplifier and a trigger circuit so that the crests or valleys in the amplitude of the resulting waves produced by the movement of the moving object in the previously mentioned manner are detected to generate a pulse (hereinafter referred to as a distance pulse) each time the moving object goes through a unit distance which is determined by the wavelength of the $f_C$ waves. In other words, one distance pulse is generated at every unit distance traveled by the moving point A. Numeral 17 designates a counter circuit for counting the number of distant pulses so that the distance traveled by the moving object is counted and recorded in terms of the halfwave length as a unit. Numeral 18 designates a circuit for converting and indicating the count of the counter circuit 17 in the form of a practical unit of the distance, and it may usually comprise a logical operating circuit and a digital indicator circuit so that the distance traveled by the moving object can be expressed as a required practical unit. Numeral 18' designates a circuit which produces a voltage output representing the distance traveled, and this circuit converts the counting result of the counter circuit 17 into an analog voltage corresponding to the distance traveled by means of a digital-analog converter or the like.

In FIG. 2, another portion designated as S contains the circuits for measuring the speed of the moving point, and numeral 19 designates a distance-speed conversion means which produces a voltage proportional to the speed of the moving object from the number of the distance pulse generated per unit time by means of a frequency-voltage converter or the like and this voltage is then delivered to an output terminal V to supply the voltage to a recording device or the like. The voltage produced by the frequency-voltage converter is also supplied to a speed indicator 20 which indicates the speed of the moving object.

If digital indication of the speed is desired, this is easily accomplished by means of a device (not shown) which counts the distance pulse for a predetermined period of time through a terminal P shown in FIG. 2.

We claim:
1. A travel distance measuring method incorporating a frequency mixing system wherein a radio wave having a first reference frequency $f_A$ radiated from a transmitting source provided at a first point is received at a second point where a secondary frequency $f_C$ is produced with the sum of said first reference frequency $f_A$ and a second reference frequency $f_B$ internally produced at said second point to transmit said secondary frequency $f_C$ therefrom, and said secondary frequency $f_C$ is then received at said first point where said secondary frequency $f_C$ is mixed with another secondary frequency having the same frequency as that of said secondary frequency $f_C$ and produced with the sum of said first reference frequency $f_A$ and another second reference frequency having the same frequency as that of said second reference frequency $f_B$ and produced at said first point so as to produce crests or valleys in the resulting waves, whereby in accordance with variations of the distance between said first and second points, travel distance information related to the wavelength of said secondary frequency $f_C$ is obtained and quantized to thereby measure the distance traveled by the moving object.

2. A travel distance measuring apparatus comprising: a circuit for quantizing the distance information related to the wavelength of the secondary frequency $f_C$ obtained according to the travel distance measuring method as set forth in claim 1, and a counter for counting the number of the output quantization pulses from said circuit, whereby the distance traveled by a moving object in the direction connecting the two points is measured.

3. A travel speed measuring apparatus comprising: a circuit for producing an electrical output proportional to the number of the output quantization pulses produced per unit time by the quantization circuit as set forth in Claim 2, whereby the speed of a moving object in the direction connecting the two points is measured.

* * * * *

UNITED STATES PATENT OFFICE
CERTIFICATE OF CORRECTION

Patent No. 3,701,151         Dated October 24, 1972

Inventor(s) Kazuo SATO; Takashi AOKI

It is certified that error appears in the above-identified patent and that said Letters Patent are hereby corrected as shown below:

In the heading, please add:

-- [30]   Foreign Application Priority Data

August 7, 1970   Japan.....69072/70   --

Signed and sealed this 1st day of May 1973.

(SEAL)
Attest:

EDWARD M. FLETCHER, JR.          .ROBERT GOTTSCHALK
Attesting Officer                  Commissioner of Patents